Patented May 21, 1929.

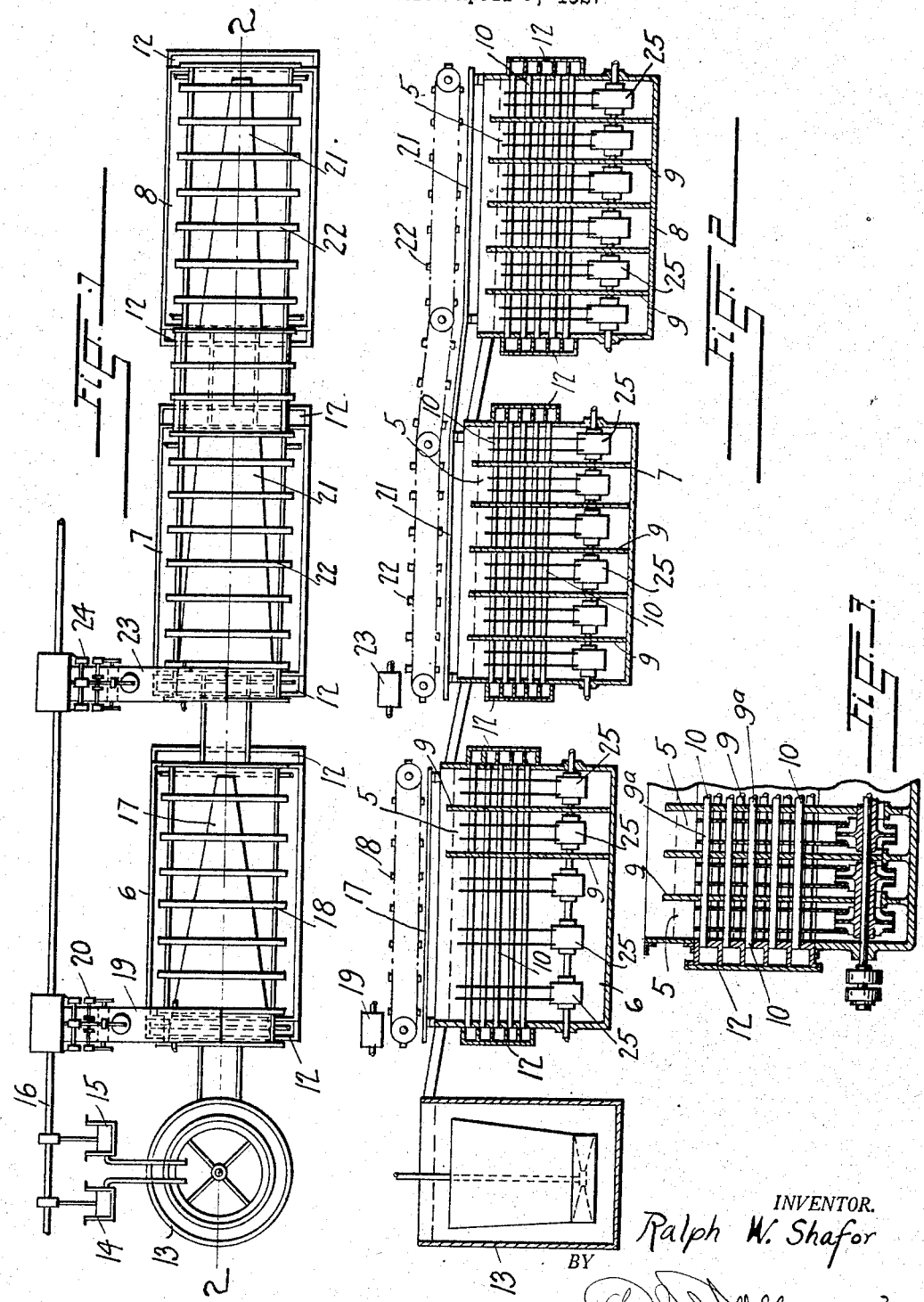

1,713,925

UNITED STATES PATENT OFFICE.

RALPH W. SHAFOR, OF DENVER, COLORADO.

PROCESS FOR EFFECTING A REACTION BETWEEN SUCROSE AND QUICKLIME.

Application filed April 5, 1927. Serial No. 181,157.

This invention relates to a method for producing the chemical reaction between sucrose and quicklime (CaO) in the process of recovering sugar from beet molasses, commonly known in the beet sugar industry as the "Steffen process."

It is the primary object of the present invention to expedite the production of tri-calcium saccharate ($3CaO.C_{12}H_{22}O_{11}$) resulting from the above described reaction by a continuous feed of material subject to a continuous discharge of the resulting compound, tri-calcium saccharate, as a precipitate which is subsequently separated from the mother solution by filtration.

A further object of the invention resides in the provision of a process by which the reaction between the sucrose and the lime is obtained in a manner more expeditious, more complete and more economical than in the batch process heretofore employed for the same purpose.

The reaction taking place in the process is represented by the following equation $$3CaO + C_{12}H_{22}O_{11} + XH_2O = 3CaO.C_{12}H_{22}O_{11} + XH_2O$$

It has been discovered by me that this reaction proceeds in two stages which may be represented by the following equations $$3CaO + 2C_{12}H_{22}O_{11} + XH_2O = 3CaO.2C_{12}H_{22}O_{11} + XH_2O$$

and $$3CaO.2C_{12}H_{22}O_{11} + 3CaO + XH_2O = 2(3CaO.C_{12}H_{22}O_{11}) + XH_2O$$

In the intermittent or batch process hereinbefore referred to these reactions were produced successively in a batch of beet molasses diluted with water by a charge of finely powdered quicklime in quantity sufficient to precipitate the desired proportion of sugar, the mixture being continuously circulated under the influence of a cooling element for the purpose of assisting the reaction and of extracting excess heat liberated by the reaction.

In order to obtain reasonable efficiency in reaction, the reagent was added to the batch of material at a predetermined rate and to produce the reaction for the recovery of the tri-calcium saccharate in any large supply of material extensive treatments of separate quantities were required with the obvious expenditure of a large amount of labor and the use of extensive equipment of necessarily large capacity. Moreover, by reason of the human element introduced into the process thus conducted, erratic results were often encountered, causing frequently excessive losses of quicklime or sucrose or both.

All of the above described objectionable features of the batch method are eliminated in the process as conducted in accordance with the present invention which, briefly, is based on the theory that by separating the two reactions in successive stages of operation to prevent back-mixing of the material in the separate stages, fresh material may be continuously supplied without disturbing the succession of the reactions necessary to produce the desired result.

In the practice of the continuous process thus defined in principle, it is highly advantageous that each reaction be conducted in a series of steps in order to obtain a necessarily high concentration of sugar which is the driving force to complete reaction. Another element entering into the continuous process is the admission of the reagent in portions distributed over the steps of each stage of the treatment which portions are quantitatively in ratio to the times of retention of the material in the several steps.

In the first stage of the process, the reaction results in the dissolution of the lime to a maximum alkalinity, and the formation of a soluble compound of sucrose and lime, sesqui calcium saccharate ($3CaO.2C_{12}H_{22}O_{11}$). The product of this reaction is subjected to the second reaction which as stated hereinbefore, is independently conducted in a second stage of the continuous process, and the effect of the second reaction is the formation of a precipitate of lime and sucrose, tri-calcium saccharate ($3CaO.C_{12}H_{22}O_{11}$).

The tri-calcium saccharate is subsequently separated from the solution in which it is suspended, by filtration and other methods commonly employed in the beet sugar industry for the recovery of the sugar-contents of the beet molasses. As in the batch process for recovering sugar from the molasses residue by the Steffens process, the continuous process requires a cooling action for the purpose of reducing the heat evolved by the reaction in both its stages, and also a circulatory motion of the material while it is subjected to the reaction, so that by a thorough and continuous intermixture, the reagent may function to its maximum capacity in the minimum of time.

In the practice of the process an excess of reagent is required to complete the reaction, the excess depending upon the quality of the reagent, the amount which reacts with compounds other than sucrose present in the mixture, and the amount that dissolves as such in the solution. This excess usually is about 50% to 60% of the amount required to theoretically effect the reaction.

The end-points of the two stages of the process are best indicated, in the first stage, by the concentration of lime in the solution phase of the mixture at which the alkalinity reaches a maximum point as the reaction is completed, and, in the second stage, by the sugar content of the solution phase of the mixture which usually amounts to approximately 10% of the total sugar in the mixture including both the solution phase and the precipitation phase.

In order to convey a better understanding of the mechanical actions involved in the practice of the process as hereinabove described, reference is had to the accompanying drawings which illustrate an apparatus suitable for carrying the process into effect.

Figure 1 represents a more or less diagrammatical plan view of the series of tanks comprised in the apparatus, Figure 2, a longitudinal section of the same along the line 2—2 Figure 1, and Figure 3 an enlarged sectional view of a portion of one of the tanks showing the method by which it is divided into units which represent the means by which the two stages of the process are each divided into a succession of steps.

The construction of each tank is similar to that of the apparatus shown and described in U. S. Patent No. 1,593,782 issued to Shafor, Morrison, Brown, Stenger and Nees on July 27, 1926, in which a cooling fluid is circulated through conduits extending through tanks in which the material under treatment has a circulatory movement. The circulating movement is imparted to the material by means of rotary centrifugal pumps in the bottom portion of a circulation chamber divided by vertical partitions into compartments for the upward and downward flow of material to and from the pumps.

The cooling fluid circulates through a bank of flues extending transversely through the circulation chamber between two heads which are subdivided to cause the fluid to move in a zigzag course from one corner of the bank of flues to another corner opposite to the first.

In the construction shown in the drawings a plurality of the above described circulation chambers 5 are assembled in tanks 6, 7 and 8 and separated from each other in pairs by partitions which extend to a determinate level for the overflow of solution from one chamber to another. The pairs of chambers thus assembled are the units which represent the steps in the two stages of the process, the first stage being conducted in the tank 6, divided, as shown, into three units and the second stage being performed in the two other tanks 7 and 8 placed in tandem relation and each having six circulation units.

The partitions 9 divide the units for the overflow of solution from one to another at a level above the bank of cooling flues as indicated at 9ª. The flues designated by the reference numeral 10, extend between two heads 12 at opposite ends of the tanks and through the partitions between the units, the heads being, as stated before, subdivided for the circulation of the cooling fluid through the entire banks of flues from one corner thereof to a diagonally opposite corner.

It will be seen that each unit of the three tanks contains a circulation chamber 5 having the equivalent of two or more pumps 25 to impart an upward and downward circulatory movement to the solution through the spaces between the cooling flues. The flues are preferably arranged in staggered rows so as to subject the liquid to frequently repeated abrupt changes of direction with a somewhat pulsating velocity which causes the solution phase to travel at a different rate than the solid phase reagents, thereby effecting a thorough intermixture and a constant displacement of the lime particles.

The molasses to be treated in the process is mixed with water in a tank 13 the two liquids being supplied in determinate proportions by the use of two pumps 14 and 15 operated from a common shaft 16. The pumps are preferably of the adjustable stroke type so that by proper adjustment of the strokes a predetermined ratio between the feeds of molasses and water may be established to produce any desired solution strength.

Variations in the quantity of solution fed into the system during any determinate space of time is readily obtained by varying the speed of the shaft, it being obvious that by this procedure the ratio of weight of water to weight of molasses will not be changed.

The solution produced in the tank 13 overflows into the first compartment of the cooler 6 in which the first reaction in the first stage of the processes is conducted. The solution overflows successively from one unit to another through the tank by reason of the continuous supply while in each compartment it is subjected to circulatory and agitative actions of the pumps and to the cooling influence of the fluid circulating through the tubes.

During the movement of the solution through the units of the tank, the reagent (CaO) is added in powdered form and in quantities sufficient to effect the first reaction of the process. It is desirable that the reagent be proportioned among the several units of the tank for the purpose of obtaining the sequence of actions required to complete each reaction in the minimum of time and with the minimum quantity of reagent.

The device provided for this purpose consists of a V-shaped apron 17 extending longitudinally above the tank over the several units thereof, and a slotted endless belt 18 which drags the material along the apron and causes it to drop across the converging edges of the same into the different units of the tank.

The material is fed onto the apron at the rearward end thereof by means of a continuous belt 19 preferably equipped with an automatic weighing and portioning appliance 20 (such as a Schaffer poidometer as shown in Patent No. 1,324,930, issued December 16, 1919, to John C. Schaffer), which regulates the weight of the material delivered by the belt in ratio to its speed of travel.

The belt and the weighing appliance are driven from the same shaft that operates the feed pumps for the solution, described hereinbefore, and it follows that the weight of the lime fed to the tank is maintained at a predetermined ratio to the quantity of molasses and water supplied to the tank during a given space of time. This feature of the process is of considerable importance inasmuch as the consumption of lime powder is a function of the sugar fed to the system and it is both from a point of economy as well as from a point of efficiency essential that the weight of lime fed to the tank be maintained at a ratio to the feed of solution to constantly deliver the proper amount of reagent per unit weight of sugar in the molasses.

The distributing element of the lime feed appliance causes the reagent to be delivered into the various units of the tank in the desired proportions so that the reaction may take place in steps as desired.

The reaction performed in the first tank, produces, as stated before, sesqui calcium saccharate which is allowed to overflow into the first one of the two tanks in which the second reaction of the process is conducted. The solution overflows successively from one unit of the tank 7 to another and from the first tank to the second tank 8 and again from one unit of the second tank to another throughout the series until the reaction is completed when the solution is discharged for the separation of the tri-calcium saccharate by filtration or other suitable method.

The feed of the reagent to the two tanks used in the second stage of the process is weighed, regulated and distributed by aprons 21, a drag chain 22, an endless belt 23, and a weighing appliance 24 similar to those described in connection with the tank employed in the first stage of the process, and operated from the same shaft with the other feeding devices of the system so that a predetermined ratio between the quantity of solution and the quantities of reagent supplied in both stages of the process during a given time period is constantly maintained.

It is to be understood that the herein described process may also be used in the manufacture of sugar from sugar cane and that the process may be successfully employed wherever sucrose is to be precipitated by means of lime.

Having thus described my invention, what I claim and desire to secure by Letters Patent is:—

1. The process of producing a precipitate of lime and sucrose in the manufacture of sugar, consisting in first effecting in a series of steps a continuous reaction of lime and sucrose solution to the point of concentration of the lime at which the alkalinity approaches a maximum point as the reaction is completed, and then effecting in a series of steps the reaction of the product of the first reaction with lime to produce the precipitate of lime and sucrose, the material in the second reaction being kept from back mixing with the material in the first reaction.

2. The process of producing a precipitate of lime and sucrose in the manufacture of sugar consisting in first effecting in a series of steps, a continuous reaction of lime and sucrose solution to produce sesqui calcium saccharate and then effecting in a series of steps the reaction of the sesqui calcium saccharate with lime to produce tri-calcium saccharate, the material in the second reaction being kept from back mixing with the material in the first reaction.

3. The process of producing a precipitate of lime and sucrose in the manufacture of sugar consisting in first effecting in a series of steps, a reaction of lime and sucrose solution to the point of concentration of the lime at which the alkalinity approaches a maximum point as the reaction is completed, and then effecting in a series of steps the reaction of the product of the first reaction with lime to produce the precipitate of lime and sucrose, the reactions being each conducted continuously in a series of consecutive steps, the material in the second reaction being kept from back mixing with the material in the first reaction.

4. The process of producing a reaction of lime and sucrose in the manufacture of sugar, consisting in continuously mixing lime with a sucrose solution in two separate stages, each stage being composed of a series of consecutive steps, and in cooling and circulating the material in each stage.

5. The process of producing a reaction of lime and sucrose in the manufacture of sugar, consisting in continuously mixing lime with the sucrose solution in two separate stages, each stage being composed of a series of consecutive steps, and in cooling and circulating the material in each step of each stage.

6. The process of producing a reaction of lime and sucrose in the manufacture of sugar, consisting in continuously adding lime to a sucrose solution in a series of consecutive steps, in each of which the solution is circulated under the influence of an impellant force, and in each of which the material is kept from back mixing with the material in the preceding step.

7. The process of producing a reaction of lime and sucrose in the manufacture of sugar, consisting in continuously adding lime to a sucrose solution in a series of consecutive steps, while the solution is subjected to the influence of an impellant force and in keeping the material in each step from back mixing with the material in the preceding step.

8. The process of producing a reaction of lime and sucrose in the manufacture of sugar, consisting in continuously adding lime to a sucrose solution in a series of consecutive steps, in which the solution is cooled and circulated under an impellant force, and the material in each step being kept from back mixing with the material in the preceding step.

9. The process of producing a precipitate of lime and sucrose in the manufacture of sugar, consisting in first effecting a reaction of lime and sucrose solution to the point of exhaustion of the lime, at which the alkalinity approaches a maximum point as the reaction is completed and then effecting the reaction of the product of the first reaction with a continuous addition of lime to produce the precipitate of lime and sucrose, the reactions being conducted under the influence of a cooling agent and the material in the second reaction being kept from back mixing with the material in the first reaction.

10. The process of producing a reaction between lime and sucrose in the manufacture of sugar, consisting in mixing molasses and water in a definite and automatically maintained ratio to produce a sucrose solution of a constant degree of strength and continuously subjecting the solution to the action of lime.

11. The process of producing a reaction between lime and sucrose in the manufacture of sugar, consisting in mixing molasses and water in a definite and automatically maintained ratio to produce a sucrose solution of a constant degree of strength, and continuously adding lime to the solution in a fixed and automatically maintained ratio to the water and molasses in the solution.

12. The process of producing a reaction of lime and sucrose in the manufacture of sugar, consisting in continuously mixing lime with a sucrose solution in two separate stages, each stage being composed of a plurality of steps.

13. The process of producing a reaction between lime and sucrose in the manufacture of sugar, consisting in subjecting a continuously supplied sucrose solution to reaction with a continuous supply of lime in two separate stages, each conducted in a series of successive steps and in keeping the material in each step from back mixing with the material in the preceding step.

In testimony whereof I have affixed my signature.

RALPH W. SHAFOR.